United States Patent Office 2,850,507
Patented Sept. 2, 1958

2,850,507

AMIDOPHOSPHORUS COMPOUNDS

Van R. Gaertner, Dayton, Ohio, assignor to Monsanto Chemical Company, St. Louis, Mo., a corporation of Delaware No Drawing. Application May 9, 1956
Serial No. 583,608

10 Claims. (Cl. 260—327)

This invention relates to the reaction of alkanesultones with alkylamidophosphorus compounds, and to the products thereof.

In accordance with the present invention, sultones are reacted with amidophosphorus compounds selected from phosphorous and phosphoric triamides in which three amido radicals are attached directly to a phosphorus atom, the N atoms of the said amido radicals each being attached to at least one lower alkyl radical, any residual valence of the said N atoms being attached to a hydrogen atom. The amidophosphorus compounds which are useful in the present process include phosphorous and phosphoric triamides. Particularly useful in the process of the invention are hexaalkyl-phosphorous and -phosphoric triamides.

The mechanism by which the present reaction proceeds is not clear. I have discovered that when an alkylamidophosphorus compound is contacted with an alkanesultone, more than one mole of the sultone may add to the phosphorus amide; furthermore, this reaction proceeds as readily with phosphoric as with phosphorous triamides. Accordingly, I believe that what occurs is at least in part a reaction of the sultone with an amido nitrogen atom of the phosphorus compound. The reaction product may be a tertiary amide or a quaternary ammonium compound; the present products are hygroscopic and difficultly crystallizable, and their precise nature has not been determined.

The sultones employed in the preparation of the present compounds are readily available compounds which may be prepared, e. g., by sulfochlorination of an organic halide, hydrolysis of the halogenated organic sulfonyl chloride thereby formed, and ring closure of the hydrolysis product, with evolution of hydrogen halide, yielding the sultone. Ordinarily, five- and six-membered rings are the chief forms of sultones prepared by this process; usually, a mixture of products is obtained. Whereas sultones are preferably named as derivatives of the corresponding hydroxy sulfonic acid, i. e.,

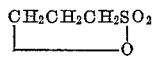

sultone of 3-hydroxy-
1-propanesulfonic acid in an alternative system, and particularly with reference to commercially produced mixed products, they may be named simply as alkanesultones, i. e., propanesultone, butanesultone, etc. For example, by butanesultone is meant any one or more of the following isomers:

(1) 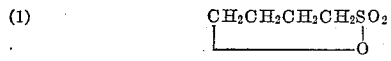

(2) 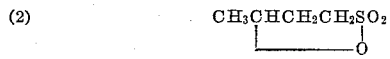

(3) 

(4) 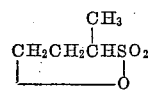

In this system, individual sultones may also be identified, if desired, by designating the point of attachment of the sultone group, i. e., δ-butanesultone designates the isomer marked (1) above, etc.

In a preferred embodiment of the present reaction, sultones of the formula

are used, where R is a saturated aliphatic hydrocarbon radical of from 3 to 16 carbon atoms. These include, e. g., propanesultone, butanesultone, isooctanesultone, tert-dodecanesultone, n-hexadecanesultone, kerosenesultone, etc. As examples of specific useful sultones may be listed, e. g., alkanesultones such as the sultone of 3-hydroxy-1-propanesulfonic acid, the sultone of 4-hydroxy-2-methyl-2-butanesulfonic acid, the sultone of 5-hydroxy-1-pentanesulfonic acid, the sultone of 5-hydroxy-4-methyl-1-hexanesulfonic acid, the sultone of 6-ethyl-5-hydroxy-2-octadecanesulfonic acid, the sultone of 7,7-di-tert-butyl-4-hydroxy-1-octanesulfonic acid, the sultone of 4-hydroxy-1-hexadecanesulfonic acid, the sultone of 3-hydroxycyclohexanesulfonic acid, etc.

Phosphorus compounds useful in the process of the invention include phosphoric and phosphorous triamides wherein the N atoms of the amide radicals are each attached to at least one lower alkyl radical, any residual valence of the N atoms being attached to a hydrogen atom. Particularly preferred in the present process are hexaakylphosphorous and phosphoric triamides. Phosphorous and phosphoric triamides are well-known compounds, which are readily prepared by the reaction of an alkylamine with phosphorus trichloride or oxychloride.

Examples of presently useful alkylphosphorous triamides which may be reacted with sultones in accordance with the present invention are, for example, incompletely alkylated phosphorous triamides such as N,N',N''-trimethylphosphorous triamide, N,N',N''-triethylphosphorous triamide, N,N',N''-triisobutylphosphorous triamide, N,N',N''-tri-sec-butylphosphorous triamide, N,N',N''-triamylphosphorous triamide, N,N'-diethyl-N''-methylphosphorous triamide, N,N,N',N'-tetraethyl-N''-methylphosphorous triamide, etc.; and hexaalkyl phosphorous triamides such as hexamethylphosphorous triamide, hexaethylphosphorous triamide, hexapropylphosphorous triamide, hexabutylphosphorous triamide, diethyltetramethylphosphorous triamide, dibutyldiethyldimethylphosphorous triamide, etc. Phosphoric triamides which may be utilized in the present process include amides wherein at least one of the nitrogen substituents is a hydrogen atom, such as N,N',N''-trimethylphosphoric triamide, N,N',N''-triethylphosphoric triamide, N,N',N''-tri-n-propylphosphoric triamide, N,N',N''-triisobutylphosphoric triamide, N,N',N''-triisoamylphosphoric triamide, N,N,N',N'-tetrabutyl-N''-ethylphosphoric triamide, etc., as well as hexaalkylphosphoric triamides such as hexamethylphosphoric triamide, hexaethylphosphoric triamide, hexapropylphosphoric triamide, hexaisobutylphosphoric triamide, hexaisoamylphosphoric triamide, tetraethyldimethylphosphoric triamide, diamyldibutyldimethylphosphoric triamide, etc.

In accordance with the present invention, phosphorus triamides are reacted with alkanesultones to give a product in which from one to three moles of the sultone had added to the phosphorus amide. Thus, for example, exemplary of the present products are the class of reaction products derived from phosphorous triamides with sultones, such as the reaction product of N,N',N''-trimethylphosphorous triamide with propanesultone, the reaction product of hexamethylphosphorous triamide with butanesultone, the reaction product of hexaethylphosphorous triamide with propanesultone, the reaction product of diethyltetramethylphosphorous triamide with octanesultone, the reaction product of hexaisobutylphosphorous triamide with kerosenesultone, etc. The class of phosphoric triamide derivatives provided by the process of this invention includes, e. g., the reaction product of N,N',N''-triethylphosphoric triamide with propanesultone, the reaction product of N,N',N''-triisobutylphosphoric triamide with butanesultone, the reaction product of hexamethylphosphoric triamide with pentanesultone, the reaction product of hexaethylphosphoric triamide with propane sultone, the reaction product of hexaisopropylphosphoric triamide with propanesultone, the reaction product of hexaisoamylphosphoric triamide with propanesultone, the reaction product of hexaisobutylphosphoric triamide with hexadecanesultone, the reaction product of dibutyldiethyldipropylphosphoric triamide with propanesultone, etc.

The novel compounds of the invention are oils or solids which are generally soluble in water. They are biological toxicants and are useful as insecticides. The novel compounds afforded by the present reaction may also be used as components of agricultural pesticide compositions, such as fungicides, nematocides, herbicides, etc., and as bacteriostats, e. g., in soap. The products derived from long-chain alkanesultones, i. e., those containing from 9 to 16 carbon atoms, may be used, for example, as surface-active agents and as plasticizers. The phosphoric amide reaction products can also be utilized as oil additives, e. g., to prevent corrosion and to improve the properties of lubricating oils and of gasoline fuels.

In carrying out the present process, the phosphorous or phosphoric triamide is simply contacted with the sultone until reaction is complete. Depending upon the nature of the reactants, the reaction proceeds at practicable rates at from room temperature or below, up to above 200° C. Suitable temperatures are, e. g., from 50° C. up to below the decomposition temperatures of the reactant. Catalysts or pressure variation may be employed, if desired, to alter the reaction rate, but generally the reaction proceeds readily without such accelerating means.

Solvents or diluents may be included in the reaction mixture, although they are not required; the solvents may assist in the control of the reaction, facilitate stirring, etc. Examples of presently useful solvents are aromatic solvents such as benzene, aliphatic hydrocarbons such as hexane, oxygen-containing liquids such as dioxane, etc.

In the present reaction, as mentioned above, from 1 to 3 moles of sultone may be combined with one mole of the phosphorus amide. The precise ratio depends on the reactivity of the reaction components, the triamides derived from secondary amines, for example, being less reactive than those derived from primary amines; the ratio in which the reaction components are contacted and the order of addition are also determining factors, although I have found that even the hexaalkyl amides tend to form adducts containing an average of at least two moles of sultone per mole of amide.

The isolation of the product may be generally accomplished by a standard procedure such as distillation to remove unreacted starting material, extraction, crystallization, etc.

The invention is illustrated, but not limited, by the following examples:

Example 1

A mixture of 16.3 g. (0.10 mole) of hexamethylphosphorous triamide with 12.2 g. (0.10 mole) of γ-propanesultone in 50 ml. of benzene was refluxed, with stirring, for 4 hours, at 80° C. After cooling, the benzene layer was decanted from the reaction mixture, and the remaining viscous, light amber syrup was washed once with hot benzene. After this syrup had been warmed under vacuum to remove benzene, there was obtained a partially crystalline material, soluble in water and in ethanol. Yield, 17.5 g. The product of this reaction was identified as the reaction product of 2 moles of hexamethylphosphorous triamide with one mole of γ-propanesultone by the following analysis:

|  | Found | Calcd for $C_{12}H_{30}N_3O_5PS_2$ |
|---|---|---|
| Percent C | 34.62 | 35.3 |
| Percent H | 8.09 | 7.42 |
| Percent N | 9.83 | 10.29 |

The reaction product of this example is toxic to yellow fever mosquito (*Aedes aegypti*) larvae in aqueous solution at a concentration of 10 p. p. m. It also produces kill of Mexican bean beetle (*Epilachna verivestis*) larvae and of cotton aphid (*Aphis gossypii*) adults when these organisms are held and allowed to feed on the leaves of plants, the stems of which have been immersed in an aqueous solution containing 40 p. p. m. of this reaction product.

Example 2

To a solution of 17.9 g. (0.10 mole) of hexamethylphosphoric triamide in 30 ml. of xylene were added 12.2 g. (0.10 mole) of γ-propanesultone, to form a clear, colorless, homogeneous solution. The mixture was heated with stirring at 110–120° C. for 18 hours, at the end of which time a viscous brown layer had formed. The xylene was decanted off, and the dark layer was washed twice with hot xylene, and then dried under vacuum. There were obtained 23.5 g. of a brown, brittle, hygroscopic gum, soluble in hot ethanol, identified as the reaction product of approximately two moles of propanesultone with one mole of hexamethylphosphoric triamide by the following analysis:

|  | Found | Calcd for $C_{12}H_{30}N_3O_7PS_2$ |
|---|---|---|
| Percent P | 6.24 | 7.32 |
| Percent S | 13.73 | 15.13 | similarly, by reaction of N,N',N''-triisobutylphosphorous triaminde with δ-butanesultone, there may be prepared an addition product containing up to about three moles of δ-butanesultone per mole of the triisobutylphosphorous triamide. From tetra-tert-butyl diethylphosphoric triamide and kerosenesultone, a 1:1 addition product may be obtained.

While the invention has been illustrated with reference to specific embodiments of product and processes, other modifications and adaptations of the invention herein disclosed will readily occur to those skilled in the art.

What is claimed is:

1. The process which comprises contacting an amidophosphorous compound selected from phosphorous and phosphoric triamides, wherein three amido radicals are attached directly to a phosphorous atom, the N atoms of the said amido radicals each being attached to at least one lower alkyl radical, any residual valence of the said N atoms being attached to a hydrogen atom, with an alkanesultone having from 3 to 16 carbon atoms and selected from the class consisting of 5, 6 and 7 membered rings sultones, and isolating from the resulting reaction product a compound wherein from 1 to 3 molar equivalents of the said alkanesultone have combined with 1 molar equivalent of the said amidophosphorus compound.

2. The process of claim 1, wherein the amidophosphorus compound is a hexaalkylphosphorous triamide, and approximately 2 molar equivalents of the alkanesultone are combined with 1 molar equivalent of the hexaalkylphosphorous triamide in the compound isolated from the resulting reaction product.

3. The process of claim 2, wherein hexamethylphosphorous triamide is reacted with γ-propanesultone at a temperature above 50° C.

4. The process of claim 1, wherein the amidophosphorous compound is a hexaalkylphosphoric triamide, and approximately 2 molar equivalents of the alkanesultone are combined with 1 molar equivalent of the hexaalkylphosphoric triamide in the compound isolated from the resulting reaction product.

5. The proces of claim 4, wherein hexamethylphosphoric triamide is reacted with γ-propanesultone at a temperature above 50° C.

6. The product of the process of claim 1.
7. The product of the process of claim 2.
8. The product of the process of claim 3.
9. The product of the process of claim 4.
10. The product of the process of claim 5.

References Cited in the file of this patent
UNITED STATES PATENTS 2,566,810    Smith _____ Sept. 4, 1951

OTHER REFERENCES

Baker: J. Chem. Soc., 1932: 86–91.
Helberger: Annalen, 565: 22–35 (1949).